April 7, 1964      L. D. GUTHRIE      3,127,868
MEANS FOR ATTACHMENT OF A PENNANT STAFF TO AUTOMOBILES
Filed April 3, 1961      3 Sheets-Sheet 1

INVENTOR.
LYLE D. GUTHRIE
BY
Knox & Knox

April 7, 1964 L. D. GUTHRIE 3,127,868
MEANS FOR ATTACHMENT OF A PENNANT STAFF TO AUTOMOBILES
Filed April 3, 1961 3 Sheets-Sheet 2
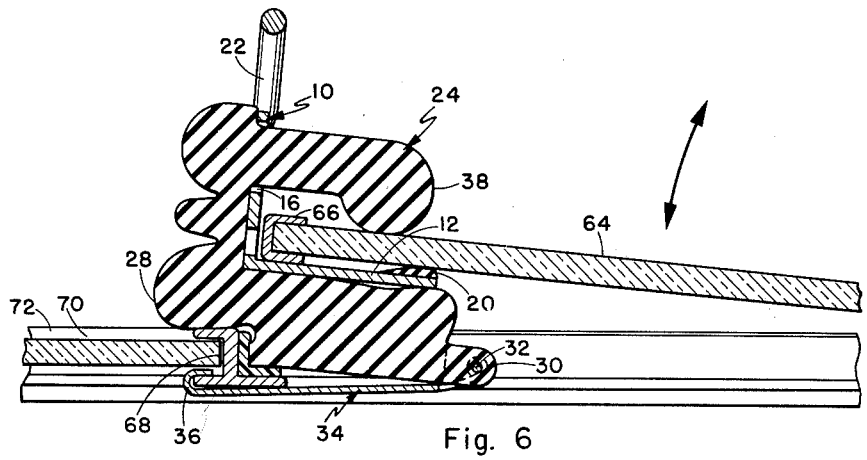
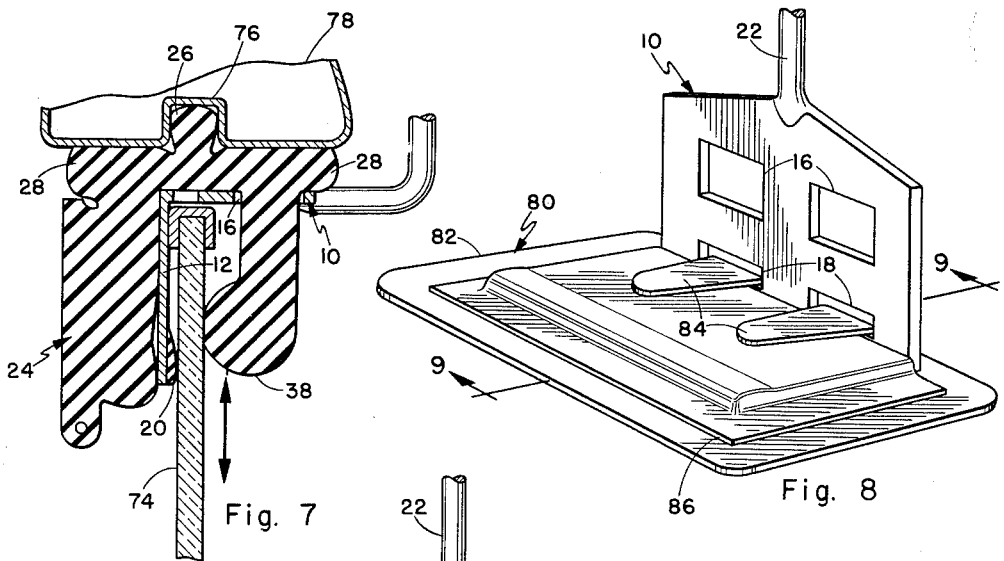
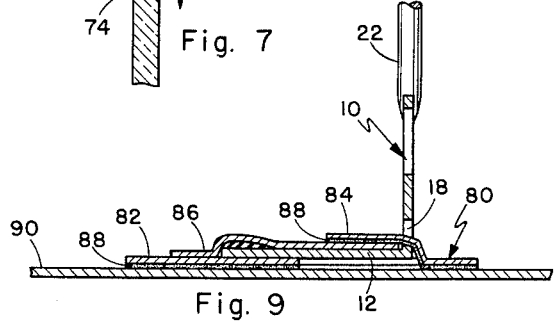
INVENTOR.
LYLE D. GUTHRIE
BY
Knox & Knox April 7, 1964 L. D. GUTHRIE 3,127,868
MEANS FOR ATTACHMENT OF A PENNANT STAFF TO AUTOMOBILES
Filed April 3, 1961 3 Sheets-Sheet 3
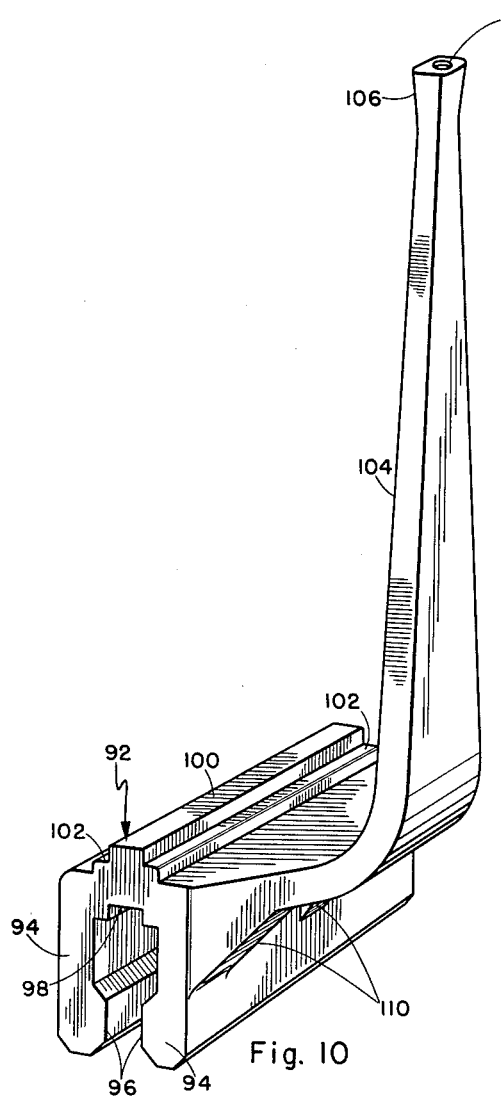
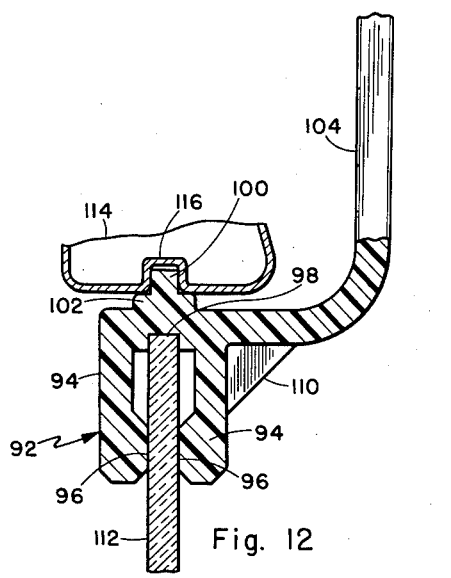
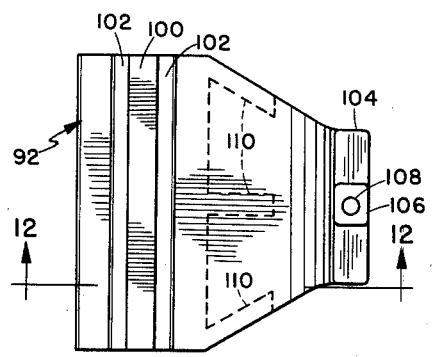
INVENTOR.
LYLE D. GUTHRIE
BY
Knox & Knox

United States Patent Office 3,127,868
Patented Apr. 7, 1964

3,127,868
MEANS FOR ATTACHMENT OF A PENNANT STAFF TO AUTOMOBILES
Lyle D. Guthrie, 1619 Guy St., Apt. 3, San Diego, Calif.
Filed Apr. 3, 1961, Ser. No. 100,084
1 Claim. (Cl. 116—173)

This invention relates to pennant mountings, and more particularly to means for attaching a pennant staff to an automobile.

Background

It is well known that it is frequently desirable to use pennants to identify an automobile that is part of a procession or part of a group. This need frequently arises in a funeral procession, particularly in those States where a procession of this type is permitted to go through red traffic lights in order to keep the procession from breaking into small sections. At other times, groups of cars going to an outing or a similar affair desire pennants to identify themselves as part of a group.

In those cases where only the driver of the lead car knows the way, it is again desirable to be able to identify his car and the others of the group, and pennants are a very convenient way to achieve this result.

In the past, there was no simple satisfactory pennant mounting that could be readily mounted onto any automobile. Some mountings required that holes be drilled into the car body. Other types of mountings required screws. Still others were formed of spring material, and tended to scratch the car's finish. Still others were suitable for one type of car, but not for another.

I have noted that pennants flapping in the wind tend to wind around the pennant staff, and tend to bend or twist it. Both of these effects are undesirable.

Objects and Drawings

It is therefore the principal object of my invention to provide an improved pennant mounting for an automobile.

It is another object of my invention to provide a pennant mounting for an automobile, that will be mountable onto almost any type of car.

It is a further object of my invention to provide a pennant mounting for an automobile that may be used without danger of scratching the car's finish.

It is still a further object of my invention to provide a pennant mounting for an automobile, wherein the pennant will not furl, and will not twist or bend the pennant staff.

Another object of this invention is to provide a pennant mounting which is adapted for fabrication from many different materials, so that the choice of material can be according to the dictates of availability and price considerations, the exact sizes and proportions being matters easily determined to suit particular conditions and needs.

Another object of this invention is to provide a pennant mounting which is practicable and inexpensive to manufacture.

The attainment of these objects and others will be realized from the following specification, taken in conjunction with the drawings, of which:

FIGURE 6 shows a cross sectional view of how my mounting and plate fit a wing window of an automobile;

FIGURE 7 is a cross sectional view of how my mounting and plate fit a vertically-moving side window;

FIGURE 8 shows another embodiment of my invention for cars without windows;

FIGURE 9 is a cross sectional view showing how the embodiment of FIGURE 8 is used;

FIGURE 10 shows still another embodiment;

FIGURE 11 shows a top view of the embodiment of FIGURE 10; and

FIGURE 12 is a cross sectional view of the embodiment of FIGURE 10.

Brief Description of the Invention

Broadly speaking, my invention contemplates a combination pennant staff and holding plate that uses one type of mounting that fits between a window and its stop, and uses another type of mounting for use on a substantially smooth and/or flat surface. It also contemplates apparatus for attaching the pennant to the staff so that the pennant doesn't furl, or twist or bend the pennant staff.

Detailed Description of the Invention

Figure 1:
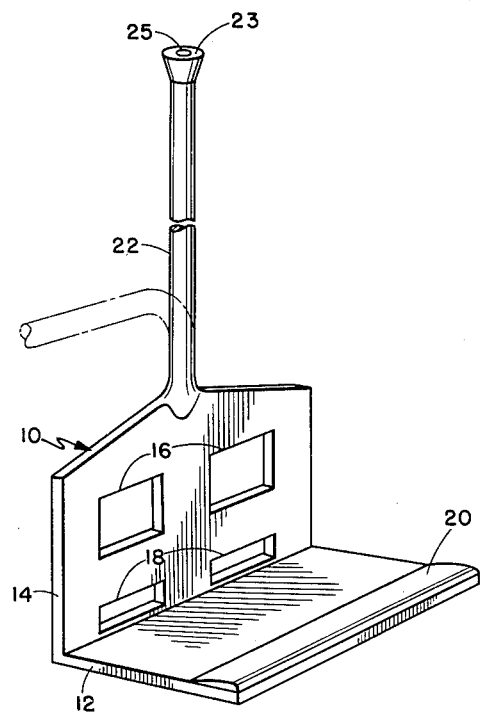
FIGURE 1 shows my basic pennant plate and shaft.

Referring now to the drawing, and particularly first to FIGURE 1, it will be observed that my base plate 10 comprises a right-angled structure having a bottom portion 12 and a perforated back 14. For reasons that will be explained later, the perforations take the form of two rectangular holes 16, and two slit-like holes 18. Bottom portion 12 has, along one edge thereof, a padded rib 20, which may be formed of any soft material, such as rubber, plastic, or the like.

A pennant staff 22 is affixed in any suitable manner to back portion 14, and terminates in a shoulder portion 23 having a threaded socket 25. For different methods of mounting, it is necessary that at times staff 22 be straight, while at other times the staff should be bent. It is preferable that staff 22 be formed so that it may be bent when desired. Alternatively, base plate 10 may have one form with a straight staff, and another form having a bent staff.

Figure 2:
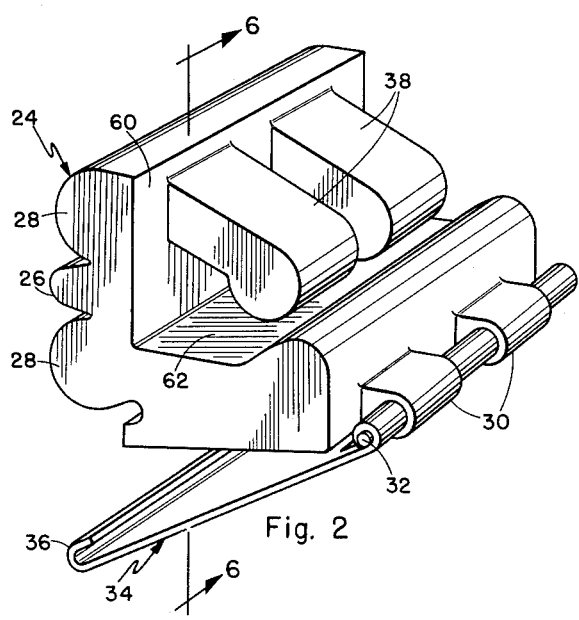
FIGURE 2 shows my basic mounting.

A mounting block 24 is shown in FIGURE 2, the block being made from a resilient material. One external face of block 24 has a central protrusion 26, and two side protrusions 28; whose function will be discussed later.

Another external surface of mounting block 24 has bosses 30 that support a hinge pin 32, onto which is hinged a hooked plate 34, the hooked end being identified by reference character 36.

Mounting block 24 also has two inwardly-directed projections 38 whose cross section is such that they fit holes 16 of the base plate 10 shown in FIGURE 1. It will be realized that projections 38 and holes 16 need not be rectangular, as long as they match.

Figure 3:
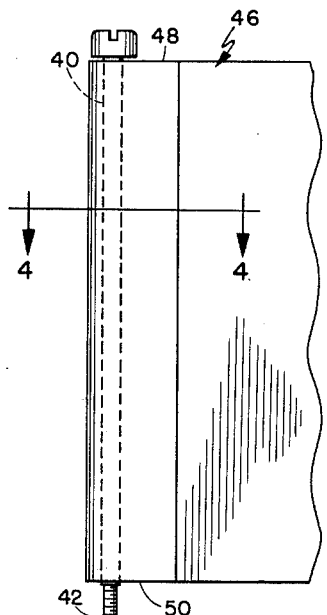
FIGURES 3–5 show a pivotable pennant.

I overcome the pennant furling and staff twisting and bending shortcomings by the structure shown in FIGURE 3. This comprises a staff extension 40 that fastens to staff 22 by means of a threaded end 42 that screws into the threaded socket 25 of the staff.

Pennant 46 has its pivotal portion 48 adjacent the staff formed of a fairly rigid material. The portion 48 has a staff-extension-receiving bore 49 that provides enough clearance so that the pennant 46 pivots freely on shaft extension 40. The portion 48 is also rigid enough so that its lower end 50 rides on shoulder 23 of staff 22.

Figure 4:
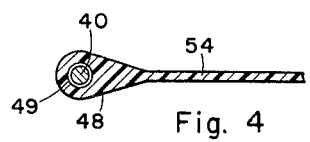

As shown in FIGURE 4 the leading edge of portion 48 is of smoothly rounded configuration while the trailing edge tapers gradually rearwardly to a smooth juncture with pennant 54.

A cross sectional view of a unitary pennant 54 is shown in FIGURE 4. This embodiment is one that would be used repeatedly.

Figure 5:
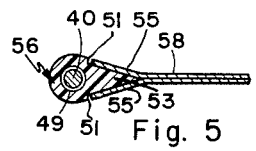

The cross sectional view of a two-piece pennant is shown in FIGURE 5. The pivoting portion 56 comprises a rigid material, and the pennant proper 58 is fastened to pivoting portion 56 in any suitable manner. This embodiment is one that may have its message changed to suit each particular case.

The trailing portion 53 of pivoting portion 56 is reduced in thickness to form rearwardly facing shoulders 51 on opposite sides thereof and substantially at the junction of the leading and trailing edges. Pennant portions 55 straddle the trailing portion 53 and are secured thereto in any well known manner. As clearly shown in FIGURE 5 the depth of the shoulders 51 is substantially equal to the thickness of the pennant portions 55.

As shown, the smooth and symmetrical lines of pivotal portion 48 are such as to reduce air turbulence, being almost perfectly configured from an aerodynamic viewpoint for the wind speeds encountered and the smooth body of the pennant proper creates a minimum of air drag.

Either embodiment of the pennant will obviate the furling, bending, and twisting shortcoming previously discussed.

In use, base plate 10 of FIGURE 1 fits into the right angled portion of the mounting block 24 shown in FIGURE 2, with back portion 14 against back surface 60, and bottom portion 12 against bottom surface 62. Projections 38 fit through openings 16 as will be more fully appreciated upon consideration of the following description of the operation of the device.

*Operation of the Invention*

My invention is designed for use with various automobiles, as previously explained. For example, if the car has wing window panels, my invention is used as shown in FIGURE 6, which is a cross sectional view looking downward. Reference character 64 indicates the wing window; and the mounting block 24 with its properly positioned base plate 10 is slid onto the edge of wing window 64 until the edging 66 of the wing window substantially abuts the back portion of the base plate 10. At this time the pennant mounting assembly is fairly securely positioned on the wing window, with the glass thereof pinched between the ends of projections 38 and pad 20.

In order to assure even more secure positioning, wing window 64 is now closed until one of the side protrusions 28 abuts the channel 68 into which side window 70 fits. Reference character 72 indicates the door into which side window 70 is mounted.

To assure further security of the pennant mounting, hooked plate 34 is pivoted on its hinge pin until hooked portion 36 engages one side of window channel 68.

This arrangement requires that staff 22 be bent so that its projects upwardly parallel to padded rib 20.

In this way, my invention provides a pennant mounting that fits any car having a wing window.

There are some automobiles that do not have a wing window, or may have a wing window that has a very sharp angle. In these cases my invention is used as shown in FIGURE 7, which is a horizontally looking cross sectional view.

This illustration shows my mounting block 24 and base plate 10 mounted on the upper edge of a vertically moving side window 74. As before, the window is pinched between the projections 38 and padded rib 20.

Window 74 is raised until central protrusion 26 enters the window receiving channel 76 of the car body 78. Side protrusions 28 are flattened by the pressure against car body 78, so that central protrusion 26 provides a good locking and positioning action.

In this arrangement hooked plate 34 is not used, and is preferably removed. Staff 24 is now bent so that it extends upwards, transverse to padded rib 20.

On those cars that do not have a window, another manner of mounting is necessary, and this is illustrated in FIGURES 8 and 9. This arrangement uses my base plate 10, but does not use the mounting block. Instead, it uses a mounting plate 80. This comprises a base 82 that has two projections that take the form of tongues 84 punched out of it, and offset a slight distance upwards. A pocket-forming sheet 86 has three of its edges secured to base 82, so that the bottom portion of base plate 10 can be inserted into the pocket.

Mounting plate 80 may be formed of plastic, so that tongues 84 snap into holes 18. The bottom surface of plate 20 may be coated with an adhesive that is protected by a protective layer of material that can be peeled off easily. When the protective layer is removed, the adhesive 88 holds tongues 84 to the upper portion of the pocket-forming sheet. It also holds mounting plate 80 to any smooth surface 90 of the automobile, such as the top of the fender or the hood of the automobile. In this embodiment, staff 22 is straight.

A somewhat different embodiment is shown in FIGURES 10, 11, and 12, this embodiment also fitting onto the top edge of a vertically moving window. As best shown in the perspective view of FIGURE 10, this embodiment is a unitary staff and mounting assembly 92, which is preferably formed of a somewhat resilient material. It comprises two parallel, spaced-apart lips 94, each terminating in a rib 96. These opposed ribs clip onto the surfaces of a side window, with the edge of the window fitting into channel 98. In this way, assembly 92 is securely mounted onto the side window, the resiliency of the material affording a good holding action.

In order to hold assembly 92 even more securely, it has an external protrusion 100. If desired, protrusion 100 may be backed up by a base 102 that adds strength, and permits a tighter fit.

Assembly 92 has a pennant staff 104, that may take any suitable form. FIGURE 10 shows a staff 104 that fairs out from the body of assembly 92. Staff 104 gradually thins down to a shoulder 106 that contains a threaded socket 108; this arrangement being similar to that previously explained.

In order to provide greater structural strength, trusses 110 are incorporated between the body and staff of assembly 92.

A top view of assembly 92 is shown in FIGURE 11, this view more clearly showing the relation between trusses 110 and the other parts of assembly 92.

The cross sectional view of FIGURE 12 shows the relation between assembly 92, vertically sliding window 112, and the frame 114. In this view, assembly 92 has been mounted onto the top edge of the vertically sliding window with its ribs 94 grasping the surfaces of window 112 in a tight frictional engagement caused by the resiliency of assembly 92. As shown, the top of window 112 fits into channel 98 of assembly 92.

FIGURE 12 also shows that the window has been raised, thus causing the central protrusion 100 to fit into the window receiving channel 116 of the frame 114. Base 102 aids in assuring a secure positioning of assembly 92.

When assembly 92 is secured in the above manner, pennant staff 104 extends upwardly; and the pennant extension and pennants of FIGURES 3, 4 and 5 may be mounted thereon as previously explained.

*Advantages*

It may thus be recognized that my improved pennant mounting invention has many advantages over prior-art devices. First, it can be used on cars having wing windows. Secondly, it can be used on cars that have vertically moving windows, but no wind windows. Thirdly, it can be used on cars that do not have any windows available for such use. Fourthly, it can be used without danger of scratching the car's finish. And finally, it obviates the problems of furling, and bending or twisting the pennant staff.

I claim:

A pennant comprising:
a body portion of sheet material;
a substantially rigid pivotal portion, disposed along one edge of said body portion, having a smoothly rounded leading edge and a gradually rearwardly tapering trailing edge;

rearwardly facing shoulders substantially at the junction of said leading and trailing edges, said pivotal portion being streamlined except for said shoulders; and said body portion having portions overlapping said trailing edge, secured thereto and abutting on said shoulders, the depth of said shoulders being substantially equal to the thickness of said overlapping portions of said body portion, whereby the over all streamlining of said pivotal portion and said overlapping portions is achieved.

References Cited in the file of this patent

UNITED STATES PATENTS

| | | | |
|---|---|---|---|
| 1,928,563 | Hetzel | Sept. 26, | 1933 |
| 2,175,077 | Craig | Oct. 3, | 1939 |
| 2,398,748 | Lange | Apr. 16. | 1946 |
| 2,732,823 | Hanson | Jan. 31, | 1956 |
| 2,856,891 | Solomon | Oct. 21, | 1958 |
| 2,888,900 | Scarlet | June 21, | 1959 |

FOREIGN PATENTS

| | | | |
|---|---|---|---|
| 462,536 | Great Britain | Mar. 11, | 1937 |